United States Patent
Rothschild et al.

(10) Patent No.: US 7,827,096 B1
(45) Date of Patent: Nov. 2, 2010

(54) SPECIAL MATURITY ASR RECALCULATED TIMING

(75) Inventors: James Rothschild, New York, NY (US); Santosh Nabar, Englewood, NJ (US); David Seaman, Short Hills, NJ (US)

(73) Assignee: JP Morgan Chase Bank, N.A., New York, NY (US)

( * ) Notice: Subject to any disclaimer, the term of this patent is extended or adjusted under 35 U.S.C. 154(b) by 24 days.

(21) Appl. No.: 11/935,076

(22) Filed: Nov. 5, 2007

Related U.S. Application Data (60) Provisional application No. 60/856,294, filed on Nov. 3, 2006.

(51) Int. Cl.
*G06Q 40/00* (2006.01)
(52) U.S. Cl. .......................... 705/37; 705/35
(58) Field of Classification Search ................... 705/35, 705/37
See application file for complete search history.

(56) References Cited

U.S. PATENT DOCUMENTS

| | | | |
|---|---|---|---|
| 4,169,285 A | 9/1979 | Walker | |
| 4,648,038 A | 3/1987 | Roberts et al. | |
| 4,739,478 A | 4/1988 | Roberts et al. | |
| 4,742,457 A | 5/1988 | Leon et al. | |
| 4,752,877 A | 6/1988 | Roberts et al. | |
| 4,933,842 A | 6/1990 | Durbin et al. | |
| 5,121,469 A | 6/1992 | Richards et al. | |
| 5,222,019 A | 6/1993 | Yoshino et al. | |
| 5,257,369 A | 10/1993 | Skeen et al. | |
| 5,270,922 A | 12/1993 | Higgins | |
| 5,297,032 A | 3/1994 | Trojan et al. | |
| 5,305,200 A | 4/1994 | Hartheimer et al. | |
| 5,419,890 A | 5/1995 | Saidi | |
| 5,454,104 A | 9/1995 | Steidlmayer et al. | |
| 5,462,438 A | 10/1995 | Becker et al. | |
| 5,497,317 A | 3/1996 | Hawkins et al. | |
| 5,517,406 A | 5/1996 | Harris et al. | |
| 5,557,798 A | 9/1996 | Skeen et al. | |
| 5,563,783 A | 10/1996 | Stolfo et al. | |
| 5,592,379 A | 1/1997 | Finfrock et al. | |

(Continued)

FOREIGN PATENT DOCUMENTS

WO    WO 98/43170    10/1998

(Continued)

OTHER PUBLICATIONS

Cody, Colin M. (Apr. 1, 2003). Short Sale Rules. Retrieved May 28, 2009, from http://web.archive.org/web/20030401201447/http://traderstatus.com/shortsale.htm Web site: http://traderstatus.com/shortsale.com.*

(Continued)

*Primary Examiner*—Susanna M Diaz
*Assistant Examiner*—Andrew F Sebroski
(74) *Attorney, Agent, or Firm*—Hunton & Williams LLP (57) ABSTRACT

An system for and method of repurchasing stock is presented. The system and method improve upon prior art techniques by limiting risk to an investment bank that enables an accelerated stock repurchase. More particularly, such risk is reduced in the event that the repurchasing company announces higher than expected dividends on the stock during the term of the accelerated repurchase transaction.

9 Claims, 2 Drawing Sheets

U.S. PATENT DOCUMENTS

| | | |
|---|---|---|
| 5,649,186 A | 7/1997 | Ferguson |
| 5,675,746 A | 10/1997 | Marshall |
| 5,706,502 A | 1/1998 | Foley et al. |
| 5,710,889 A | 1/1998 | Clark et al. |
| 5,724,593 A | 3/1998 | Hargrave, III et al. |
| 5,778,157 A | 7/1998 | Oatman et al. |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,073,104 A | 6/2000 | Field |
| 6,073,115 A | 6/2000 | Marshall |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,460,021 B1 | 10/2002 | Kirksey |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 7,191,392 B1 | 3/2007 | Coar |
| 7,236,955 B2 * | 6/2007 | Sugahara ............... 705/37 |
| 7,310,616 B2 * | 12/2007 | Sugahara ............... 705/37 |
| 7,536,342 B2 * | 5/2009 | Jokisch et al. ............ 705/37 |
| 7,539,642 B2 * | 5/2009 | Meehan et al. ............ 705/37 |
| 2001/0011241 A1 | 8/2001 | Nemzow |
| 2001/0011242 A1 | 8/2001 | Allex et al. |
| 2001/0018674 A1 | 8/2001 | Schein et al. |
| 2001/0025264 A1 | 9/2001 | Deaddio et al. |
| 2001/0032217 A1 | 10/2001 | Huang |
| 2001/0042034 A1 | 11/2001 | Elliott |
| 2001/0043235 A1 | 11/2001 | Best et al. |
| 2001/0044771 A1 | 11/2001 | Usher et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0013753 A1 | 1/2002 | Marks de Chabris et al. |
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |
| 2002/0022956 A1 | 2/2002 | Ukrainczyk et al. |

| | | |
|---|---|---|
| 2002/0023053 A1 | 2/2002 | Szoc et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0029183 A1 | 3/2002 | Vlahoplus et al. |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0049666 A1 | 4/2002 | Reuter et al. |
| 2002/0054115 A1 | 5/2002 | Mack et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0073007 A1 | 6/2002 | Ayache |
| 2002/0078253 A1 | 6/2002 | Szondy et al. |
| 2002/0087373 A1 | 7/2002 | Dickstein et al. |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |
| 2002/0091625 A1* | 7/2002 | Blauvelt et al. ............... 705/37 |
| 2002/0099646 A1 | 7/2002 | Agarwal et al. |
| 2002/0099656 A1 | 7/2002 | Poh Wong |
| 2002/0112056 A1 | 8/2002 | Baldwin et al. |
| 2002/0123947 A1 | 9/2002 | Yuste et al. |
| 2002/0130868 A1 | 9/2002 | Smith |
| 2002/0138390 A1 | 9/2002 | May |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0161692 A1 | 10/2002 | Loh et al. |
| 2002/0161853 A1 | 10/2002 | Burak et al. |
| 2002/0169707 A1 | 11/2002 | Koek et al. |
| 2002/0174043 A1 | 11/2002 | Gilbert et al. |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194109 A1* | 12/2002 | Takeshi ....................... 705/37 |
| 2002/0194114 A1 | 12/2002 | Erdmier |
| 2003/0004942 A1 | 1/2003 | Bird |
| 2003/0009411 A1 | 1/2003 | Ram et al. |
| 2003/0018558 A1 | 1/2003 | Heffner et al. |
| 2003/0018714 A1 | 1/2003 | Mikhailov et al. |
| 2003/0033212 A1 | 2/2003 | Sandhu et al. |
| 2003/0033232 A1* | 2/2003 | Sugahara ..................... 705/36 |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0074300 A1* | 4/2003 | Norris ......................... 705/37 |
| 2003/0078869 A1 | 4/2003 | Williams |
| 2003/0088496 A1 | 5/2003 | Piotrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0140035 A1 | 7/2003 | Burrows |
| 2003/0149653 A1 | 8/2003 | Penney |
| 2003/0154071 A1 | 8/2003 | Shreve |
| 2003/0158949 A1 | 8/2003 | Miller et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0229555 A1* | 12/2003 | Marlowe-Noren ........... 705/35 |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0064397 A1 | 4/2004 | Lynn et al. |
| 2004/0078248 A1 | 4/2004 | Altschuler |
| 2004/0103003 A1 | 5/2004 | Mayers et al. |
| 2004/0148247 A1 | 7/2004 | Miller et al. |
| 2004/0162775 A1 | 8/2004 | Winklevoss et al. |
| 2004/0167850 A1 | 8/2004 | Dreyer et al. |
| 2004/0220885 A1 | 11/2004 | Salzmann et al. |
| 2004/0225596 A1 | 11/2004 | Kemper et al. |
| 2004/0236665 A1* | 11/2004 | Negishi et al. ................ 705/37 |
| 2005/0060256 A1 | 3/2005 | Peterson et al. |
| 2005/0086170 A1 | 4/2005 | Rao |
| 2007/0250425 A1* | 10/2007 | Jamieson et al. .......... 705/36 R |
| 2007/0276744 A1* | 11/2007 | Burke .......................... 705/35 |

FOREIGN PATENT DOCUMENTS

| | | |
|---|---|---|
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

Grullon, Gustavo, and David Ikenberry. "What Do We know About Stock Repurchases?." Journal of Applied Corporate Science. 13.1 (200): 31-51.*

Fisher, Mark. "Special Repo Rates: An Introduction." Federal Reserve Bank of Atlanta: Economic Review. (2002 2nd Quarter): 27-43.*

Bauer-Balmelli, Maja, and Jager, Hans-Joachim. "Tax Aspects of Securities Lending and Repo." International Securities Lending: Worldwide Directory of Securities Lending. 1995-1996. 159-163.*

Manco Et Al., A Framework for Adaptive Mail Classification, 14th IEEE Conference on Tools with Artificial Intelligence (ICTAI'02), Nov. 4, 2002, p. 387.

Silverman, A new strategy for giving away your money, Wall Street Journal, D1, Oct. 6, 2004.

Czejdo, Automatic generation ontology based anntations in XML and their use in retrieval systems, Web Information Systems Engineering, 2000, Proceedings of the First International Conference, Jun. 19, 2000, p. 296.

Novell, Inc., Beginning of Viewing Information and Viewing Basic Information about a print job.

Block Trades Market Practice, Apr. 1, 2003, pp. 1-10.

Chacko, Cephalon, Inc. Taking Risk Management Gherory Seriously.

Kus, Contingent capital: just in the capital management sets a new standard; Sponsored statement.

Electronic Trading Tools.

Martin, Email Report, Issue 11, Aug. 16, 2001, printed Aug. 2, 2005.

Fast Email Extractor 4.4.

Form 10-K, United States Securities and Exchange Commission, no date,year ending Dec. 31, 2003.

Freddie Mac's document custody procedure overview—2003.

PILA, In Case Of Emergency; contingent capital.

Intellseek and Inxight Partner to Provide New Business Intelligence Solutions, www.inxight.com/news/021029_intelliseek.html, Oct. 29, 2002.

Unknown, Investigating Systems.

May, Modeling and Querying Structure and Contents of the Web, 10th International Workshop on Database & Amp; Expert Systems Applications, Sep. 1, 1999, p. 721.

Rupali Et Al., Phrase-based Text Representation for Managing the Web Documents.

Lam Et Al., Querying Web Data—The WebQA Approach.

Rising to the challenge of global STP, Euromoney Publications PLC Global Inventor, Nov. 1, 1999, pp. 51-52; Issn. 0951-3604.

STP in the Bond Market?, Wall Street & Technology, Dec. 1, 2002, p. 20.

Ericson, Softwerc releases patent-pending.

IBM Corp., Strict Read Order Control for a Queing System.

Carchiolo Et Al., Structuring the Web.

Witten Et Al., Text Mining: A New Frontier for Lossless Compression.

Fan Et Al., The Internet and Future Financial Markets; Industry Trend or Event, Association for Computing Machinery, Inc., Sec. 11, vol. 43; Nov. 1, 2000, p. 82; Issn: 0001-0782.

Emery, Et Al., The Measurement of Liquidity, Journal of Accounting Research, vol. 20, No. 2, Part 1, p. 290-303, Autumn 1982.

Calado, The Web-DL Environment for Building Digital Libraries from the Web.

Ribiero-Neto Et Al., Top Down Extraction of Semi-Structured Data, String Processing and Information Retrieval Symposium & amp.

Roberts, Top Priority on Bottom Line: More Companies Seeting to Manage Business Risks.

TradeWeb's STP vision, Euromoney Institutional Investor PLC, Sec. 406, vol. 34, Feb. 1, 2003, p. S6; Issn: 0014-2433.

Elkayam, Using Indexed Bonds.

Myllymaki, With Standard XML Technologies.

Hewlett-Packard, x4queview.org.

* cited by examiner

SPECIAL MATURITY ASR RECALCULATED TIMING

RELATED APPLICATION

The present application claims priority to U.S. Provisional Application No. 60/856,294 entitled "Special Maturity ASR Recalculated Timing" to Rothschild et al., filed Nov. 3, 2006, the contents of which are incorporated by reference herein in their entirety.

FIELD OF THE INVENTION

The present invention generally relates to a system for and method of equity repurchase from the marketplace. More particularly, the present invention generally relates to a system for and method of stock repurchase with reduced risk to the investment bank should the repurchasing party increase its cash dividend during the term of the repurchase agreement.

BACKGROUND OF THE INVENTION

Entities, such as corporations, that issue equity instruments, such as stock, occasionally wish to repurchase shares from the marketplace. However, purchasing a large number of shares from the market generally tends to drive the price of the shares up. Thus, a problem arises when a corporation wishes to repurchase a large number of shares from the market, in that the price of the shares increases as the corporation purchases additional large batches of shares. A solution to the problem is for the repurchasing corporation to work with another entity, typically an investment bank ("repurchasing investment bank"), who is able to quickly obtain a large number of shares by borrowing them from other investment banks ("lender investment banks"). This type of borrowing generally does not drive the share price up. The repurchasing investment bank then sells the shares for cash to the corporation that issued them. Over time, the repurchasing investment bank purchases small batches of shares from the market and conveys them to the lender investment banks in order to settle the loans. Purchasing small batches of shares over time generally avoids the problem of driving share prices up. The repurchasing investment bank typically benefits from the arrangement by charging the corporation fees.

DETAILED DESCRIPTION OF CERTAIN EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

A traditional "fixed-cash" accelerated stock repurchase agreement ("ASR") allows a corporation to purchase a large block of shares without having to pay a premium to the market that is typically associated with purchasing large blocks of stock. A typical transaction may be structured as follows. On day one, the corporation pays an investment bank ("repurchasing investment bank") for a large block of stock. In return, the repurchasing investment bank supplies the corporation with the block of stock. The repurchasing investment bank typically obtains the block of stock by borrowing the shares from one or more investment banks ("lender investment banks"). For example, on day one, the corporation pays $100 million to the repurchasing investment bank and receives one million shares. (This example assumes, by way of non-limiting example, that the corporation wishes to repurchase one million shares, and that the market price for a single share is $100 on day one.) The entire transaction is set to last one hundred days. Each day (e.g., day n), the repurchasing investment bank purchases shares from the market using an amount of cash equal to, by way of non-limiting example, $RCA_n/DR$, where "$RCA_n$" denotes the Remaining Cash Amount on day n, and "DR" denotes the number of days remaining in the transaction. The $RCA_n$ for any day after day one may be calculated as, by way of non-limiting example, $RCA_n = RCA_{n-1} \times (1+R) - C$, where "$RCA_{n-1}$" denotes the Remaining Cash Amount on the previous day (n−1), "R" denotes the interest rate, and "C" denotes the amount of cash spent that day purchasing shares (e.g., $RCA_n/DR$). That is, the Remaining Cash Amount on any given day after day one may be calculated as the previous day's Remaining Cash Amount plus interest on that amount minus the cash spent on purchasing shares that day. At maturity (in this example, day one hundred) the Remaining Cash Amount is equal to zero. If, over the course of the transaction, the repurchasing investment bank has repurchased more than one million shares, it conveys the surplus to the corporation. If the repurchasing investment bank has purchased less than one million shares, then the corporation will deliver the difference to the repurchasing investment bank. The repurchasing investment bank the settles with the lender investment banks during the course of the transaction. That is, as it acquires shares, the repurchasing investment bank transfers them to the lender investment banks.

A discount ASR is an alternative to the traditional fixed-cash ASR. This program is similar to a fixed-cash ASR, except that the repurchasing investment bank may select a maturity date at any time during (i.e., within) a specified time period. The following is a non-limiting example. On day one, the corporation pays $100 million to the repurchasing investment bank and receives one million shares (assuming, again by way of non-limiting example, that the corporation wishes to repurchase one million shares, and that the market price for a single share is $100 on day one). The repurchasing investment bank borrows the shares from one or more lender investment banks. The maturity date is initially set at nine months from day one. However, the repurchasing investment bank has the right to re-set the maturity date to at any date between six and nine months from day one.

Once the (original or accelerated) maturity date has been reached, a Final Share Number ("FSN") is determined as, by way of non-limiting example, $100 million divided by the following quantity: the average SEC Rule 10b-18 volume-weighted average price ("VWAP") from inception to maturity minus $0.50. The $0.50 in the previous sentence represents a discount to the VWAP. Other discount amounts are also contemplated, such as, by way of non-limiting example, $0.01, $0.05, $0.10, and any $0.01 increment up to and past $100.00.

Continuing this example, if the FSN is greater than one million shares, the repurchasing investment bank delivers the excess to the corporation. If the FSN is less than the original one million shares, the corporation delivers the difference to the repurchasing investment bank (in shares or cash). The repurchasing investment bank returns the borrowed shares, which the repurchasing investment bank purchases at market value to the lender investment banks during the course of the transaction.

The repurchasing investment bank is able to provide a guaranteed discount to the VWAP because: (1) the repurchasing investment bank is guaranteed a return on cash for the first six months after inception (e.g., by investing the $100 million and any remainder after stock repurchases), and (2) the repurchasing investment bank has an option to extend the maturity for up to an additional three months. This value of this option can be locked in by the repurchasing investment bank's traders. Corporations that care more about purchasing shares below VWAP and less about how long it takes to complete the program are ideal candidates for the discount ASR.

The repurchasing investment bank typically hedges the ASR or discount ASR by borrowing shares at inception and delivering them to the corporation. During the term, as the repurchasing investment bank buys more shares, it delivers them to the stock lenders (e.g., the lender investment banks) to close out the repurchasing investment bank's short position. If the corporation pays a dividend during the term of the accelerated buyback or discount ASR, the repurchasing investment bank will owe the dividend to stock lenders (e.g., the lending investment banks) on the number of shares the repurchasing investment bank is short at that time. As a result, the original economic terms of the deal typically reflect the amount of dividends that are expected to be paid during its term. Once the contract is in place, however, the repurchasing investment bank remains exposed to risk if the corporation raises its dividend versus the original expected level. Repurchase agreements have dealt with this exposure in one of two ways: (1) including a provision in the contract causing it to terminate upon announcement of dividends above a specified level per share, or (2) having the client pay through any increases of their dividends to the investment bank. Solution (1) is sub-optimal because clients often do not want to terminate their buyback programs prematurely. Further, solution (1) may cause a company to withhold dividends that it might otherwise declare, a situation that is unfavorable both to the company's investors and to market perceptions of the company. Solution (2) is sub-optimal because it would give rise to disadvantaged treatment under U.S. accounting rules, as explained immediately below.

The Emerging Issues Task Force ("EITF") Issue 03-6 says that issuer securities/derivatives that give the investor/counterparty the right to participate in dividends are subject to two-class Earnings Per Share ("EPS") treatment. Under two-class treatment, earnings are divided among common stock and other "participating securities" so the effect is to dilute basic EPS. In general, diluting EPS is unfavorable for a company. Convertibles and other derivative trades other than equity forwards with a strike adjustment for dividend increases do not receive two-class treatment because the adjustments are a contingent transfer of value rather than a non-contingent one. In other words, there should be a material possibility that when an adjustment is made, the issuer will not ultimately get charged (e.g., a convertible that ultimately ends up out-of-the-money). Once a security passes this test at inception, there is no requirement to retest over time, so when converts/derivatives later become in-the-money there is no impact. Note that "extraordinary dividends" can be passed through if they are deemed extraordinary by the corporation's board of directors, so the concern is with respect to protection for ordinary dividend increases.

Certain embodiments of the present invention allow the repurchasing investment bank to adjust one or both of the start date and end date of the maturity window of a discount ASR in order to recompense itself for a dividend increase. Other embodiments allow the repurchasing investment bank to adjust a floor value, which acts as a constructive lower limit on the stock's value for the purpose of calculating the FSN and settling with the company. Examples of these embodiments are discussed in detail below in relation to FIGS. 1 and 2.

Figure 1:
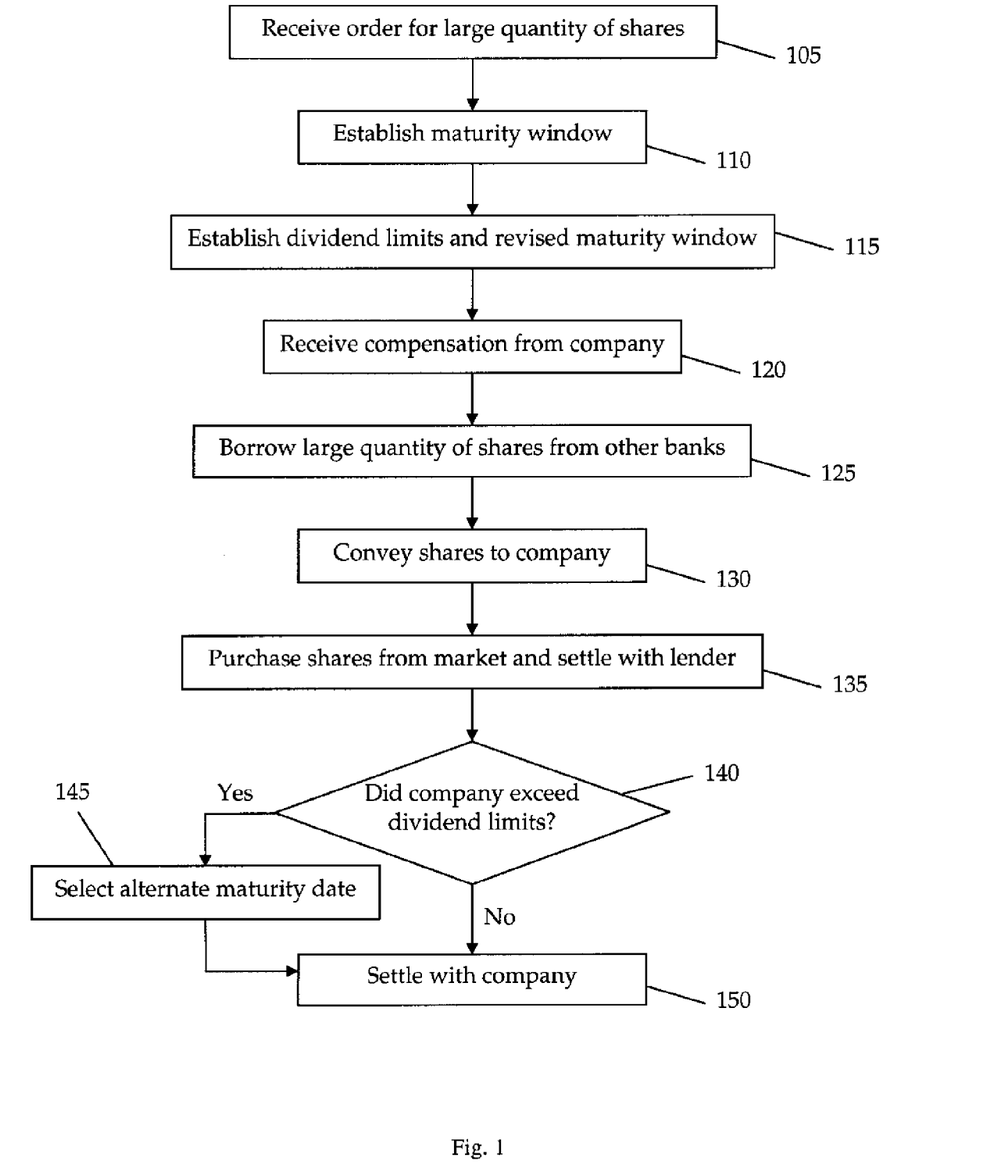
FIG. 1 is a flowchart illustrating an embodiment of the present invention.

FIG. 1 is a flowchart illustrating an embodiment of the present invention. According to this embodiment, a discount ASR is improved upon as follows. By way of non-limiting example, assume the model used to price the original transaction factors in a dividend policy of $1.00 per share per quarter paid to shareholders (based on the best guess at inception). If announced dividends during any quarter within the transaction are above $1.00 per share, the repurchasing investment bank may adjust the transaction by one or both of: (1) moving the earliest possible maturity date up to earlier than six months from inception, and (2) moving the final maturity date to later than nine months after inception. Moving the possible maturity dates serves to preserve economic value for the repurchasing investment bank. One or both of the direction and amount of maturity date movement may be determined after the corporation's dividend announcement.

More particularly, the embodiment of FIG. 1 creates value for the repurchasing investment bank by increasing the window of possible maturity dates. This value can be locked in by the repurchasing investment bank's traders using computer-based derivative pricing models and will offset losses due to the dividend increase. That is, the repurchasing investment bank may re-calculate the value of the outstanding transaction, using standard derivative pricing models, for various permutations of adjusted maturity dates. Based on such re-calculations, the repurchasing investment bank may select a revised maturity date. Although this increased optionality is valuable to the repurchasing investment bank, the adjustment is only a contingent transfer of value from the client's (i.e., corporation's) perspective. There is no assurance that the corporation will be worse off relative to a case where the adjustment is not made (the final pricing is determined by the average stock price during a different window period, which may be higher or lower). As a result, the embodiment of FIG. 1 does not give rise to two-class EPS accounting and therefore does not create disadvantaged accounting. The structure of this embodiment is novel and unique at least because it allows corporations to keep the transactions outstanding, while protecting the repurchasing investment banks from dividend increases, and not subjecting the corporation to disadvantaged accounting treatment.

Turning specifically to FIG. 1, the method begins at step 105 when the investment bank receives an order from a company for a large number of the company's shares. The term "large" here means that the quantity of share is such that a purchase of such shares on the open market incurs a significant risk of raising the market price of the shares. The order may be unsolicited or may originate from within a pre-existing relationship between the investment bank and the company. The order for the quantity of shares may be in terms of a specific quantity of shares or in the form of a specific amount of cash (e.g., a specific dollar amount). Either way, as the order corresponds to a large number of shares, acquiring them from the market would likely move the price of the shares higher, a situation that the company wishes to avoid. Accordingly, the company and the investment bank enter into an agreement according to an embodiment of the present invention, in this example, the embodiment of FIG. 1.

At step 110, the parties (i.e., the company and the repurchasing investment bank) agree on a maturity window for the transaction. In general, the maturity window is a set of two dates, between which the repurchasing investment bank is allowed, as a matter of right, to select a maturity date for the transaction. The maturity date is used, for example, in calculating an average share price when the repurchasing investment bank settles with the company at the end of the transaction. The length (i.e., duration) of the maturity window may be, by way of non-limiting example, one month, two months, three months, six months, nine months or one year. Further, by way of non-limiting example, the maturity window may begin after any of the following time intervals following the start of the transaction: one month, two months, three months, six months, nine months or one year.

At step 115, the parties agree on one or more limits on ordinary dividends declared during the pendency of the transaction. Typically, such limits are established by the repurchasing investment bank. By way of non-limiting example, such a limit may be $0.05 per share. Other limits include, by way of non-limiting example, any one-cent increment between $0.01 up to and beyond $100.00 per share. Multiple limits may be established, each corresponding to a different time period. For example, from the start of the transaction up to three months from the start of the transaction, the limit on ordinary dividends declared by the company may be set at zero. For the next three months, the limit on ordinary dividends declared by the company may be set at $0.10 per share. During the three month interval after that, the limit on ordinary dividends declared by the company may be set at $0.15 per share. During the next six month interval, the limit on ordinary dividends declared by the company may be set at $0.20 per share. The above dividend limits and intervals are exemplary only and are not meant to limit the present invention. Other intervals, such as monthly, every six months, or yearly may be employed, together with like intervals or combined with dissimilar intervals. Similarly, other dividend limit amounts are contemplated.

At step 115, the parties may also agree on a revised maturity window. (In alternate embodiments, this step may occur between steps 140 and 145.) The revised window may contain the maturity window that was established at step 110. For example, if the transaction begins on Jan. 1, 2008 and the original maturity window set at step 110 is from Oct. 1, 2008 to Jan. 1, 2009, the revised maturity window may be set at Jul. 1, 2008 through Apr. 1, 2009. Note that the revised maturity window may share the same start or end date (but not both) as the original maturity window. In the event that the company declares ordinary dividends in excess of those set at step 115, the repurchasing investment bank is given the opportunity to select a revised maturity date within the revised maturity window as explained further below in reference to steps 140 and 145.

At step 120, the company pays the repurchasing investment bank the amount of cash determined at step 105 (assuming the company agrees to the terms set forth in steps 105, 110 and 115). That is, the company pays a specific dollar amount (the "purchase price") to the repurchasing investment bank. The day on which the company pays the purchase price may be the same day on which the repurchasing investment bank conveys shares to the company per step 130. However, in some embodiments, steps 120 and 130 occur on different days. Further, either of the days on which steps 120 and 130 occur may count as the inception day for the purpose of calculating an average share value at the end of the transaction. Other days may alternately count as the inception day for such purpose.

At step 125, the repurchasing investment bank borrows as many shares as it can from one or more lender investment banks, up to the number of shares ordered. Because the shares are borrowed rather than obtained on the open market, the market price of the shares will generally remain unaffected by the loan.

At step 130, the repurchasing investment bank conveys a number of shares to the company. This number of shares, the "initial share number," may be by way of non-limiting example, the number of shares ordered at step 105 if the order is in the form of a share number, or the purchase price conveyed at step 105 (if the order is in the form of a purchase price) divided by the current market value of a share or divided by a given par value of a share. That is, at step 130, the repurchasing investment bank conveys to the company a number of shares corresponding to the payment received at 120. The conveyance may be performed manually, electronically, or via any other communication channel, such as U.S. or private mailing companies.

In some instances, the repurchasing investment bank will initially convey only a portion of the shares that it will eventually convey to the company. In such instances, the repurchasing investment bank and company may agree that the repurchasing investment bank will convey a remaining number of shares at a later delivery date.

Step 135 represents that the repurchasing investment bank conducts a series of share purchases on the open market during the duration of the transaction. This step typically occurs repeatedly while the transaction is pending. Such a series of purchases may be performed in accordance with fixed-cash or discount ASRs as discussed above. When the repurchasing investment bank obtains such shares from the market, it typically conveys them to the lender investment banks involved in the loan referred to at step 110.

At step 140, the repurchasing investment bank determines whether the company exceeded any dividend limits set out at step 115. This step is ongoing throughout the pendency of the transaction. If no limits are exceeded, then the method proceeds to step 150 and the parties settle the transaction according to the maturity date, which the repurchasing investment bank selects from among the dates contained within the maturity date window determined at step 110. If, on the other hand, the repurchasing investment bank determines that the company exceeded the dividend limits set forth at step 115, then the repurchasing investment bank is given the option to select a maturity date from the revised maturity window, which may have been established at step 115 or may be calculated after step 140. In embodiments in which the revised maturity window is calculated after step 140, the repurchasing investment bank may select a revised window based on a plurality of computations, performed using one or more derivative pricing models, in which the value of the outstanding transaction is computed for various potential window adjustments. The parties then settle the transaction according to the revised maturity date selected by the repurchasing investment bank at step 150, as described immediately below.

At step 150, the parties settle the transaction. This step occurs on or after the maturity date, whether the maturity date is selected from the original maturity window determined at step 110 or the revised maturity window determined on or after step 115. The parties may settle according to the settlement procedure set forth above in the discussions of the fixed-cash or discount ASRs. A further settlement technique is discussed presently. The repurchasing investment bank calculates a Settlement Number as the difference between (1) the purchase price divided by (a) the VWAP of the shares during the transaction from the inception date up until the maturity date (whether original or revised) minus (b) a discount (by way of non-limiting example, $0.50) and (2) the initial number of shares conveyed to company at step 130. That is, Settlement Number=[(purchase price)÷(VWAP−discount)]−[initial share number], where the VWAP is calculated relative to the trading days that fall on and between the inception date and the maturity date. If the Settlement Number is negative, the company conveys shares or cash to the repurchasing investment bank corresponding to this number. If the Settlement Number is positive, the repurchasing investment bank conveys shares or cash corresponding to the Settlement Number to the company. If the Settlement Number is zero, neither party makes any conveyance to the other party.

Thus, the embodiment of FIG. 1 improves upon a discount ASR by allowing the repurchasing investment bank to alter, upon a trigger event, the initial window in which it may accelerate the maturity date. The window is typically altered by one or both of stepping forward its opening date and stepping backward its closing date. The amounts that these dates may be altered include, by way of non-limiting example, not more than: a day, two to five days, a week, two to three weeks, a month, two to six months, and a year. Trigger events typically include the corporation announcing a dividend in excess of a dividend ceiling agreed upon at the beginning of the transaction. The window may be altered according to computer projections, based on derivative pricing models, of the value of the outstanding transaction.

Figure 2:
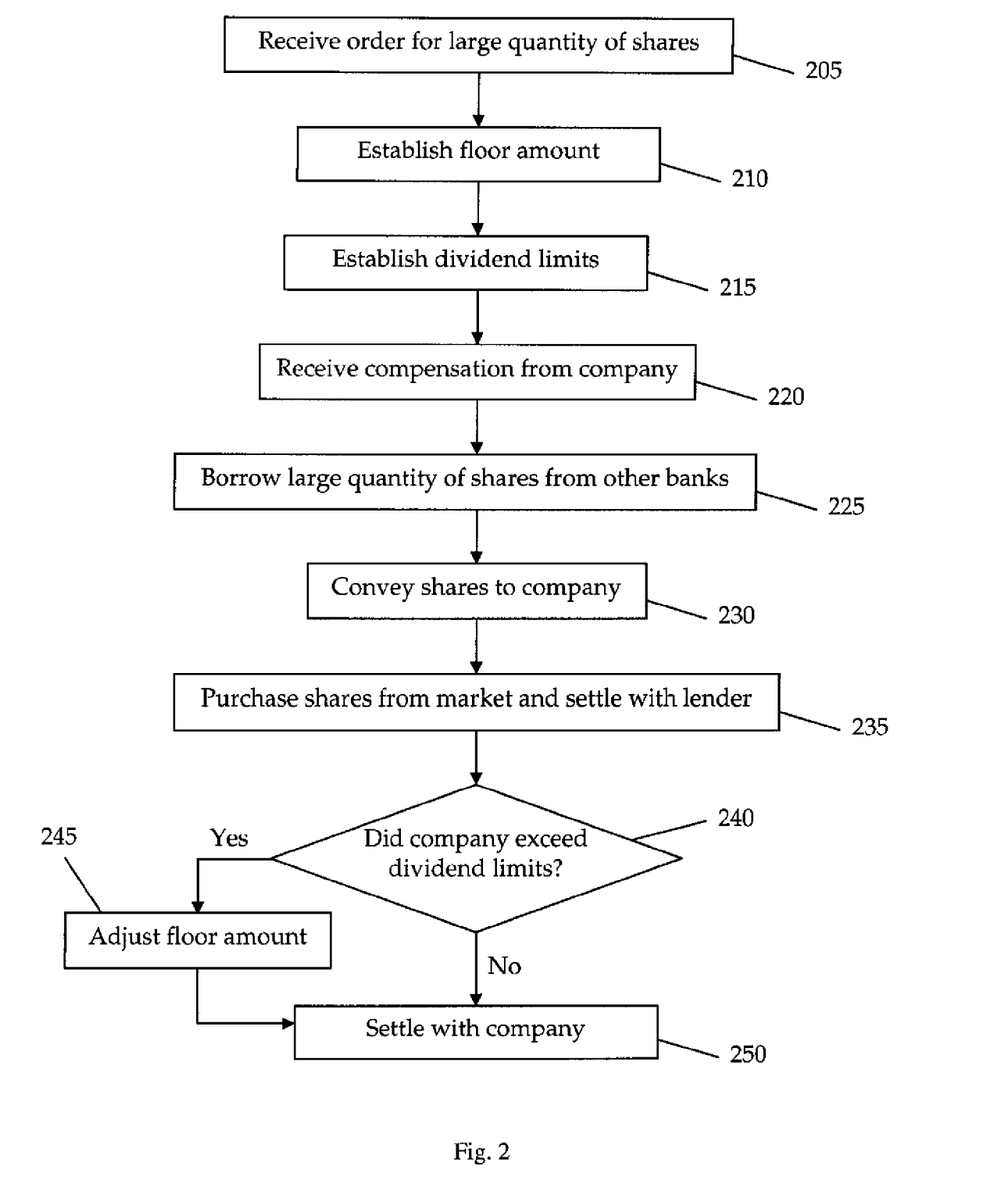
FIG. 2 is a flowchart illustrating an embodiment of the present invention.

FIG. 2 is a flowchart illustrating an embodiment of the present invention. At step 205, the repurchasing investment bank receives an order for a large quantity of share in essentially the same manner as step 105 of FIG. 1.

At step 210, the repurchasing investment bank establishes a floor amount. This amount acts as a minimum value of a share for the purpose of settling with the company at step 250. In the embodiment of FIG. 2, the floor amount is initially set very small, by way of non-limiting example, $0.01 per share. In other embodiments, the floor amount may be set to $0.00. Yet other amounts are also contemplated, such as the market value of a share at the time of step 210, or the value of a share at the time of step 210 minus a substantial discount (e.g., a discount by 10%, 25%, 50%, 75% or 90%). Usage of the floor amount is discussed in detail below in reference to steps 240, 245 and 250.

At step 215, the repurchasing investment bank establishes dividend limits in essentially the same manner as at step 115 of the embodiment of FIG. 1. As in step 115, there may be one, or more than one, dividend limit; if more than one, then each may be associated with a different time interval. In contrast to step 115 of some embodiments of FIG. 1, in the embodiment of FIG. 2, the parties do not establish a revised maturity window. At step 220, the company conveys a purchase price as compensation to the repurchasing investment bank. Similar to the embodiment of FIG. 1, this step is occurs if the company agrees to the terms set forth at steps 205, 210, and 215. At step 225, the repurchasing investment bank attempts to borrow shares from lender investment banks, again in essentially the same manner as step 110 of FIG. 1. At step 230, the repurchasing investment bank conveys an "initial share number" to the company, the number of shares reflecting the purchase price as described above in relation to step 130. The inception date for the purpose of calculating an average share value at step 250 may be the date on which either of steps 220 or 230 occur, or may be another date. At step 235, which repeatedly occurs during the pendency of the transaction, the repurchasing investment bank buys shares from the market and conveys them to the lender investment banks, as in step 135 of FIG. 1.

At step 240, the repurchasing investment bank determines whether the company exceeded the dividend limit(s) set out at step 215. If not, then the process proceeds to step 250, where the parties settle the transaction as discussed below. If, on the other hand, the repurchasing investment bank determines that the company exceeded one or more dividend limits as set forth at step 215, then the process branches to step 245 at which the repurchasing investment bank adjusts the floor amount upwards. The floor amount may be adjusted to the VWAP as calculated over a portion (e.g., the first half or another initial segment) of the term of the transaction. The floor amount may alternately be adjusted to the VWAP as calculated over all or a portion of the transaction term, plus a penalty amount. Such penalty amounts may be, by way of non-limiting example, $0.01, $0.02, $0.05, $0.10 or any other value between, for example, $0.01 and $100.00. Other revised floor amounts are contemplated; essentially, the repurchasing investment bank selects a revised floor amount such that the fair value of the transaction to the repurchasing investment bank is preserved.

At step 250, the parties settle the transaction. First, the repurchasing investment bank determines a "Valuation Number" as the minimum between (1) the purchase price divided by the floor amount (whether the original or revised floor amount) and (2) the VWAP of the shares minus a discount (by way of non-limiting example, the discount may be $0.50). Thus, the Valuation Number=min([purchase price)÷(floor amount)], [(purchase price)÷(VWAP−discount)]). The VWAP is calculated relative to the inception date and the maturity date of the transaction. The repurchasing investment bank then calculates a Settlement Number as the difference between (1) the Valuation Number and (2) the initial number of shares conveyed to company at step 230. That is, Settlement Number=[Valuation Number]−[initial share number]. If the Settlement Number is negative, the company conveys the absolute value of that number of shares, or cash corresponding to that number of shares, to the repurchasing investment bank. If the Settlement Number is positive, the repurchasing investment bank conveys shares or cash corresponding to the Settlement Number to the company. If the Settlement Number is zero, neither party makes any conveyance to the other party.

Thus, the embodiment of FIG. 2 improves upon the prior art by allowing the repurchasing investment bank to revise, upon a trigger event, a floor amount below which the share price is constructively determined not to fall in settling with the company at the end of the transaction. The floor amount is initially set at close to zero (e.g., $0.01 per share). Upon a trigger event, such as an exceeded dividend limit, the floor amount is raised to a level that allows the repurchasing investment bank to preserve the fair value of the transaction to the repurchasing investment bank.

Other embodiments of the present invention include features of the embodiments of both FIG. 1 and FIG. 2. Such embodiments may include establishing dividend limits per steps 115 and 215. Such embodiments may further include establishing a revised maturity window per step 115 and establishing a floor amount per step 210.

For example, an embodiment includes the ability for a repurchasing investment bank to, at its discretion and upon one or more dividend limits being exceeded, either select a revised maturity window and settle as in the embodiment of FIG. 1, or adjust a floor amount and settle as in the embodiment of FIG. 2. Assuming that a dividend limit is exceeded, if the repurchasing investment bank decides to utilize the settlement procedure of the embodiment of FIG. 1, then settlement occurs per steps 140, 145 and 150. If the repurchasing investment bank decides to utilize the settlement procedure of the embodiment of FIG. 2, then settlement occurs per steps 240, 245 and 250.

Other embodiments allow the repurchasing investment bank to, at its discretion and upon one or more dividend limits being exceeded, both select a revised maturity window as in the embodiment of FIG. 1 and adjust a floor amount as in the embodiment of FIG. 2. In such embodiments, the calculation of the Valuation Number per step 250 of FIG. 2 takes into account the VWAP of the shares during the time from inception to the revised settlement date, where the revised settlement date is determined according to the embodiment of FIG. 1. Thus, for example, the parties may settle at the end of the transaction by performing the following steps. Assuming that the company exceeds dividend limits, the repurchasing investment bank selects a revised maturity date from a revised maturity window as per step 145. The repurchasing investment bank then calculates a "Valuation Number" as the minimum between (1) the purchase price divided by the floor amount (whether the original or revised floor amount) and (2) the purchase price divided by a discounted VWAP of the shares, where the VWAP is calculated relative to the inception date and the revised settlement date. The repurchasing investment bank then calculates a Settlement Number as the difference between (1) the Valuation Number and (2) the initial number of shares conveyed to company at step 230. As in the embodiment of FIG. 2, if the Settlement Number is negative, the company conveys the absolute value of that number of shares, or cash corresponding to that number of shares, to the repurchasing investment bank, and if the Settlement Number is positive, the repurchasing investment bank conveys shares or cash corresponding to the Settlement Number to the company. If the Settlement Number is zero, neither party makes any conveyance to the other party.

Embodiments of the present invention may include that the repurchasing investment bank charges a transaction fee. Such a fee may be, by way of non-limiting example, flat or a percentage of the purchase amount.

Embodiments of the present invention may include using computer models to hedge the transaction. Such models may calculate the value of the entire transaction. Other computer models may be used to determine preferable investment positions for the cash initially conveyed from the corporation to the repurchasing investment bank. Yet other models may be used to determine the price of the entire transaction once a trigger event has occurred. This price may be used to select a revised maturity window or maturity date. Models contemplated according to certain embodiments of the present invention include Monte Carlo simulations, e.g., in which the transaction is priced according to various different combinations of derivative announcement, maturity windows and/or maturity dates.

Embodiments of the present invention may be implemented using hardware, firmware, software, or any combination thereof. Standard computer hardware and/or software programming techniques may be used. Any of the calculations described herein may be performed by computer hardware or software. By way of non-limiting example, computer hardware or software may perform the calculations associated with any or a combination of the following steps: 115, 140, 145, 150, 215, 240, 245 and 205. Such computer hardware or software may convey the results of such calculations to a user by way of a user-readable display, or may convey the results to further hardware or software for further processing.

Other embodiments, uses, and advantages of the invention will be apparent to those skilled in the art from consideration of the specification and practice of the invention disclosed herein. The specification and drawings should be considered exemplary only, and the scope of the invention is accordingly not intended to be limited thereby.

We claim:

1. A method of providing a company with a large quantity of stock shares issued by the company by borrowing the large quantity of shares from a lender and gradually repurchasing small quantities of the shares from the market in order to settle with the lender, the method comprising:

receiving, from the company, a request for a first quantity of shares issued by the company;

communicating, to the company, at least one dividend limit associated with the shares;

communicating, to the company, a maturity window consisting of a start maturity date and an end maturity date, the maturity window being subject to change upon the at least one dividend limit associated with the shares being exceeded;

receiving, from the company, compensation associated with a second quantity of shares issued by the company;

borrowing, from at least one lender, the second quantity of shares issued by the company;

conveying the second quantity of shares to the company;

purchasing a plurality of quantities of the shares at market value;

detecting that one or more ordinary dividends associated with the shares and declared by the company exceeds the at least one dividend limit;

computing, using a computer, a value of an outstanding transaction with the company, the outstanding transaction comprising a potential revised maturity date;

setting, as a consequence of said detecting and based on the computing, a revised maturity date outside of the maturity window;

calculating a settlement number of shares as a difference between (1) a number of shares corresponding to the compensation and an average share value and (2) the second quantity of shares, wherein the average share value is determined over a time period associated with the revised maturity date;

compensating the company if the settlement number of shares is negative;

receiving compensation from the company if the settlement number is positive; and settling with the at least one lender.

2. The method of claim 1 wherein the first quantity equals the second quantity.

3. The method of claim 1 wherein the average share value comprises a volume weighted average price of the shares as determined over a time period concluding on the revised maturity date.

4. The method of claim 1 wherein the number of shares corresponding to the compensation and an average share value comprises the compensation divided by a discounted average share value.

5. A method of providing a company with a large quantity of stock shares issued by the company by borrowing the large quantity of shares from a lender and gradually repurchasing small quantities of the shares from the market in order to settle with the lender, the method comprising:

receiving, from the company, a request for a first quantity of shares issued by the company;

communicating, to the company, a maturity window consisting of a start maturity date and an end maturity date, the maturity window being subject to change upon a first dividend limit associated with the shares being exceeded;

communicating, to the company, floor amount, the floor amount being subject to change upon a second dividend limit associated with the shares being exceeded;

receiving, from the company, compensation associated with a second quantity of shares issued by the company;

borrowing, from at least one lender, the second quantity of shares issued by the company;

conveying the second quantity of shares to the company;

purchasing a plurality of quantities of the shares at market value;

detecting that one or more ordinary dividends associated with the shares and declared by the company exceeds the at least one dividend limit;

computing, using a computer, a value of an outstanding transaction with the company, the outstanding transaction comprising one or both of a potential revised maturity date and a potential revised floor amount;

setting, as a consequence of said detecting and based on the computing, a revised maturity date outside of the maturity window;

adjusting, as a consequence of said detecting and based on the computing, the floor amount;

determining, as an effective share value, the greater of the floor amount and an average share value, wherein the average share value is determined over a time period associated with the revised maturity date;

calculating a settlement number of shares as a difference between (1) a number of shares corresponding to the compensation and the effective share value and (2) the second quantity of shares;

compensating the company if the settlement number of shares is negative;

receiving compensation from the company if the settlement number is positive; and settling with the at least one lender.

6. The method of claim 5 wherein the first quantity equals the second quantity.

7. The method of claim 5 wherein the average share value comprises a volume weighted average price of the shares as determined over a time period concluding on the revised maturity date.

8. The method of claim 5 wherein the average share value is discounted.

9. The method of claim 5 wherein the number of shares corresponding to the compensation and the effective share value comprises the compensation divided by the effective share value.

* * * * *